United States Patent
Bruck et al.

(10) Patent No.: US 9,395,126 B2
(45) Date of Patent: Jul. 19, 2016

(54) METHOD AND APPARATUS FOR COOLING SUPERALLOY TURBINE COMPONENTS DURING COMPONENT WELDING

(71) Applicants: Gerald J. Bruck, Oviedo, FL (US); Ahmed Kamel, Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 571 days.

(21) Appl. No.: 13/798,312

(22) Filed: Mar. 13, 2013

(65) Prior Publication Data
US 2014/0262198 A1    Sep. 18, 2014

(51) Int. Cl.
| | |
|---|---|
| *F28F 27/00* | (2006.01) |
| *B23K 37/00* | (2006.01) |
| *B23K 31/02* | (2006.01) |
| *F28F 13/00* | (2006.01) |
| *B23P 6/00* | (2006.01) |
| *F01D 5/28* | (2006.01) |

(52) U.S. Cl.
CPC ............... *F28F 27/00* (2013.01); *B23K 31/02* (2013.01); *B23K 37/003* (2013.01); *B23K 2201/001* (2013.01); *B23K 2203/08* (2013.01); *B23P 6/002* (2013.01); *F01D 5/286* (2013.01); *F28F 2013/006* (2013.01); *Y10T 29/4935* (2015.01)

(58) Field of Classification Search
CPC ..... F28F 21/067; F28F 2255/02; F28F 21/06; F28F 3/02; F28F 27/00; F28F 2013/006; B23P 15/26; B23P 6/002; B23K 37/003; B23K 31/02; B23K 2201/001; B23K 2203/08; Y10T 29/4935

USPC ................................................... 165/287, 46
See application file for complete search history.

(56) References Cited

U.S. PATENT DOCUMENTS

| | | | | |
|---|---|---|---|---|
| 4,185,369 A  * | 1/1980 | Darrow | ................... | B23P 15/04 165/170 |
| 5,067,234 A  * | 11/1991 | Fraser | ..................... | B23P 6/002 228/119 |
| 5,306,897 A  * | 4/1994 | Fraser | ..................... | B23P 6/002 165/46 |
| 6,025,730 A  * | 2/2000 | Akram | ................. | G01R 1/0408 324/750.25 |
| 2007/0147002 A1* | 6/2007 | Otsuki | .................. | H01L 23/467 361/704 |
| 2008/0271876 A1* | 11/2008 | Morin | .................. | B23K 37/003 165/104.19 |

* cited by examiner

*Primary Examiner* — Tho V Duong
*Assistant Examiner* — Raheena Rehman

(57) ABSTRACT

Superalloy components, such as steam and gas turbine blades or vanes, are cooled during welding fabrication or repair, so as to reduce likelihood of weld metal and weld heat affected zone cracking during weld solidification and during post weld heat treatment. More particularly the invention relates to cooling superalloy steam and gas turbine components, such as turbine blades or vanes during weld repair. A heat sink apparatus includes a heat sink having a first surface adapted for abutting orientation with a turbine component second surface; and a non-gaseous, conformable, heat conductive material adapted for conforming contact with both surfaces. The heat conductive material fills gaps between the heat sink and turbine component abutting surfaces, and facilitates enhanced conductive heat transfer, in order to minimize negative heat effects from welding. The apparatus may be incorporated in a cooling system that varies heat sink cooling capacity in response to sensed component temperature.

18 Claims, 4 Drawing Sheets

METHOD AND APPARATUS FOR COOLING SUPERALLOY TURBINE COMPONENTS DURING COMPONENT WELDING

BACKGROUND OF THE INVENTION

1. Field of the Invention

The invention relates to cooling superalloy components during welding fabrication or repair, so as to reduce likelihood of weld heat affected zone cracking during weld solidification and during post weld heat treatment. More particularly the invention relates to cooling superalloy steam and gas turbine components, such as turbine blades or vanes during weld repair.

2. Description of the Prior Art

"Structural" repair of gas turbine or other superalloy components is commonly recognized as replacing damaged material with matching alloy material and achieving mechanical properties, such as strength, that are close to the original manufacture component specifications (e.g., seventy percent ultimate tensile strength of the original specification). For example, it is preferable to perform structural repairs on turbine blades that have experienced cracks, so that risk of further crack growth is reduced, and the blades are restored to original material structural and dimensional specifications.

Structural repair of nickel and cobalt based superalloy material that is used to manufacture turbine components, such as cast turbine blades, is challenging, due to the metallurgical properties of the finished blade material. The finished turbine blade alloys are typically strengthened during post casting heat treatments, which render them difficult on which to perform subsequent structural repair welding. For example, a superalloy having more than 6% by weight percentage aggregate aluminum or titanium content, such as cast nickel alloy 247 (Mar-M-247, CM 247), is more susceptible to post heat treatment strain age cracking when thereafter subjected to high-temperature welding than a lower aluminum-titanium content X-750 superalloy.

Currently used welding processes for superalloy structural fabrication or repair generally involve substantial melting of the substrate adjoining the weld preparation site (the weld heat affected zone), and complete melting of the welding rod or other filler material added. When a blade constructed of such a material is welded with rods of the same or similar alloy, the blade is susceptible to solidification (aka liquation) cracking within and proximate to the weld, and/or strain age (aka reheat) cracking during subsequent heat treatment, processes intended to restore the superalloy original strength and other material properties comparable to a new component. Known laser cladding repair processes utilize laser energy to melt filler material and a smaller zone of the blade or vane substrate than comparable traditional welding processes, but often require multiple sequential layer applications to restore eroded substrate surface topology. A laser clad substrate still has a weld heat affected zone, and heat absorption is cumulative during the lengthy sequential cladding process. It is preferred during welding, if possible, to limit the weld heat affected zone temperature to below approximately 572° F. (300° C.), which reduces substantially the likelihood of substrate/weld solidification and reheat cracking.

In the past, chiller block heat sinks have been applied to the superalloy blade or vane turbine component, in order to transfer heat out of the weld zone. Heat transference out of the weld zone reduces the weld heat affected zone volume as well as its peak temperature. Known chiller blocks are generally fabricated from highly conductive metals, such as aluminum or copper, and often incorporate circulating cooling fluid passages. The chiller block heat sinks have surface profiles matching that of corresponding portions of the original manufactured dimensional component substrate surface area, adapted for abutting contact with the substrate component. It is intended to conduct heat from the component substrate surface directly to a corresponding abutting portion of the heat sink. Good conductive heat transfer efficiency requires direct contact between the heat sink and substrate. Manufacturing dimensional tolerance variances in either the component substrate surface or the chiller block surface increases likelihood of non-abutting surface mismatch gaps, which reduces conductive heat transfer efficiency across the gap.

Repairable turbine superalloy components that have been in used in field service often have rough surface finishes and mechanical surface distortion that inhibit full contact between the original factory dimensional profile heat sink and the now field degraded profile component substrate. Dimensional gaps between the component surface and mating corresponding heat sink surface greatly reduce thermal conductivity. Gasses occupying the gaps, such as ambient air, or inert welding gasses also have low thermal conductivity. Gap pads may be inserted between the chiller block heat sink surfaces and the substrate mating surface to help accommodate thermal contact. The gap pads also have limited thermal conductivity compared to direct chiller metal to superalloy contact. Inconsistent and/or asymmetrical gap pad placement also can cause inconsistent cooling profiles across the substrate.

Thus, a need exists for a heat sink apparatus for cooling a superalloy component during component welding that facilitates efficient, uniform conductive heat transfer from the component substrate.

Another need exists for a heat sink apparatus for cooling a superalloy component during component welding that has setup ease comparable to existing known chiller blocks.

Yet another need exists for cooling system for cooling a superalloy turbine component during component welding that facilitates controlled heat transfer, and preferably selectively variable heat transfer rate and capacity in response to the substrate's temperature during a welding process.

SUMMARY OF THE INVENTION

Accordingly, an object of the invention is to provide a heat sink apparatus for cooling a superalloy component during component welding that facilitates efficient, uniform conductive heat transfer from the component substrate.

Another object of the invention is to provide a heat sink apparatus for cooling a superalloy component during component welding that has setup ease comparable to existing known chiller blocks.

Yet another object of the invention is to provide a cooling system for cooling a superalloy turbine component during component welding that facilitates controlled heat transfer, and preferably selectively variable heat transfer rate and capacity in response to the substrate's temperature during a welding process.

These and other objects are achieved in accordance with the present invention by a cooling system for welding superalloy steam and gas turbine blade or vane components, so as to reduce likelihood of weld heat affected zone cracking during weld solidification and during post weld heat treatment. The cooling system includes heat sink apparatus having a first surface adapted for abutting orientation with a turbine component second surface; and a non-gaseous, conformable, heat conductive material adapted for conforming contact with both surfaces. The conforming heat conductive material eliminates and fills gaps between the heat sink and turbine component abutting surfaces, and facilitates enhanced conductive heat transfer, in order to minimize the welding heat affected zone. In different embodiments of the invention the heat conductive material comprises an elastomer, including by way of example a metallic- or ceramic-filled, acrylic or heat curable elastomer. In other embodiments the heat conductive material comprises grease, fluid confined between the heat sink and the component, or material capable of undergoing physical phase change (e.g., solid to liquid) when heated during component welding. In various embodiments the heat sink comprises a fluid-filled chilling fixture, a fluid filed cooling bladder or a thermoelectric module. In some embodiments the cooling system varies heat sink cooling capacity in response to sensed component temperature, preferably in a closed feedback loop control system. Embodiments of the invention are directed to methods for cooling a superalloy turbine component during component welding, comprising interposing a non-gaseous, conformable, heat conductive material between a first surface of a heat sink and a second surface of a turbine component; and capturing the heat conductive material in conforming contact with both the first and second surfaces by abutting the heat sink and turbine component.

The invention features a heat sink apparatus for cooling a superalloy turbine component during component welding that includes a heat sink having a first surface adapted for abutting orientation with a turbine component second surface. The apparatus has a non-gaseous, conformable, heat conductive material adapted for conforming contact with both surfaces by abutting the heat sink and turbine component.

The invention also features a cooling system for cooling a superalloy turbine component during component welding. The cooling system includes a variable cooling capacity heat sink having a first surface adapted for abutting against a turbine component second surface. A non-gaseous heat conductive material is in contact with and conforms to the entire heat sink first surface, and is further adapted for conforming contact with the turbine component's entire second surface. A temperature sensor is adapted for sensing turbine component temperature. A control system is coupled to the temperature sensor and the heat sink, for varying heat sink cooling capacity in response to sensed component temperature.

The invention additionally features a method for cooling a superalloy turbine component during component welding by interposing a non-gaseous, conformable, heat conductive material between a first surface of a heat sink and a second surface of a turbine component; and capturing the heat conductive material in conforming contact with both the first and second surfaces by abutting the heat sink and turbine component.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a cooling system for welding superalloy steam and gas turbine blade or vane components, so as to reduce likelihood of weld metal and weld heat affected zone cracking during weld solidification and during post weld heat treatment. The cooling system includes heat sink apparatus having a first surface adapted for abutting orientation with a turbine component second surface; and a non-gaseous, conformable, heat conductive material adapted for conforming contact with both surfaces. The heat conductive material fills gaps between the heat sink and turbine component abutting surfaces, and facilitates enhanced conductive heat transfer, in order to minimize negative heat effects from welding. In some embodiments the cooling system varies heat sink cooling capacity in response to sensed component temperature, preferably in a closed feedback loop control system.

Figure 1:
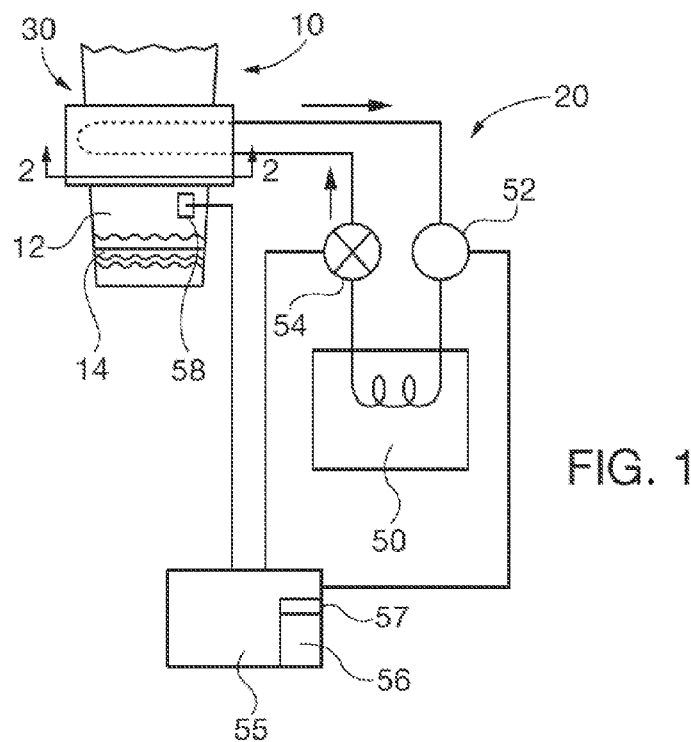
FIG. 1 is a schematic diagram of a cooling system for cooling an exemplary superalloy turbine blade component during welding repair, in accordance with an embodiment of the present invention.
Figure 2:
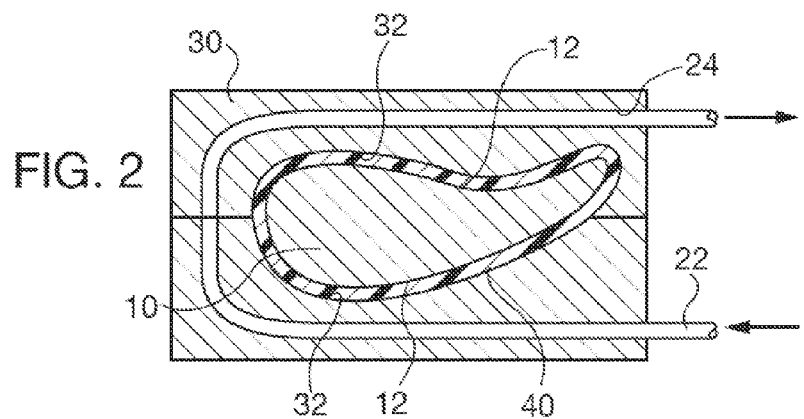
FIG. 2 is a cross sectional elevational view of a heat sink apparatus of the cooling system of FIG. 1, in accordance with an embodiment of the present invention.
Figure 3:
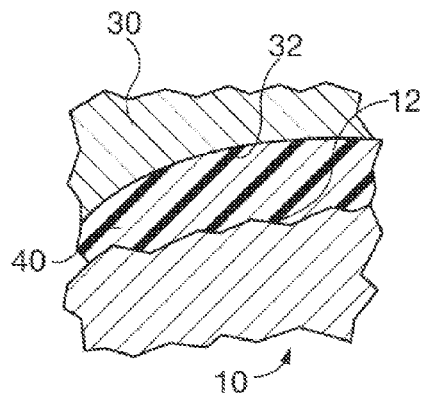
FIG. 3 is an enlarged view of a portion of the heat sink apparatus of FIG. 2, in accordance with an embodiment of the present invention.

FIGS. 1-3 show a cooling system of the present invention, for cooling an exemplary superalloy turbine blade component 10 during component welding. The turbine blade substrate surface 12 has a weld repair site 14 proximal the blade 10 tip. It is desirable to maintain a blade 10 temperature below the transition phase temperature threshold of the blade material (preferably below 572° F./300° C.), and a small weld heat affected zone, so as to minimize likelihood of weld and/or substrate cracking during weld solidification and post weld heat treatment. The cooling system 20 of the present invention includes a heat sink chiller block 30 of known construction, having a first inner surface 32 profile that conforms to the corresponding profile of the turbine blade surface profile 12. As will be described in greater detail below, a conformable heat transfer material layer 40 is interposed, captured between and conforms to the opposing turbine blade surface 12 and the chiller block first inner surface 32, so that there are no gaps between those opposed surfaces that would otherwise reduce conductive heat transfer capacity and rate from the hotter blade 10 to the chiller block heat sink 30. The chiller block heat sink 30 preferably incorporates circulating cooling fluid inlet 22 and outlet 24 passages, for transferring heat out of the chiller block to a heat exchanger 50. Circulating pump 52 and/or flow control valve 54 regulate coolant (e.g., water or glycol/water mix) flow in order to vary selectively the chiller block 30 cooling capacity. Optionally the circulating pump 52 may have a variable flow rate and/or optionally the flow control valve 54 may be capable of remote variable actuation. Also optionally, a known controller 55 (e.g., an industrial controller or personal computer), including a processor 56 accessing and executing a non-transitory software program instruction set stored in non-volatile memory 57 may selectively actuate the circulating pump 52 and/or control valve 54 in order to regulate the heat sink chiller block 30 cooling capacity. Optionally the controller 55 is coupled to a temperature sensor 58 that senses the superalloy blade component 10 temperature, and varies the heat sink chiller block 30 cooling capacity in response to the sensed temperature, such as in a known closed feedback control loop.

Referring to FIG. 3, the conformable heat transfer material layer 40 that is interposed between the opposing turbine blade surface 12 and the chiller block first inner surface 32 conforms to and contacts both surfaces, filling any gaps that may exist due to variations in manufacturing tolerances, field degraded dimensional distortion or surface finish (e.g., caused by thermal ablation, pitting, surface grinding finish variances, etc.). In this manner consistent gap filling between the opposed surfaces 12, 32 enhances heat transfer efficiency and uniformity between the blade 10 and the chiller block heat sink 30. Inserting and capturing the conformable heat transfer material 40 between the opposed surfaces 12, 32 prior to their positioning in abutting relationship (e.g., by closing the clam shell-like heat sink chiller block 30 about the turbine blade 10 circumferential surface 12) does not require any significant increased cooling system 20 set up difficulty compared to known chiller block cooling systems that do not incorporate the conformable filler material layer 40. Conversely, insertion of the conformable filler material layer 40 is significantly easier than aligning and inserting known gap filler pads between a known chiller block and a turbine blade surface, with less likelihood of inconsistent, non-uniform heat transfer potential that is associated with gap filler pad installation.

The conformable heat conductive filler material 40 is selected to withstand the temperature range associated with the superalloy component welding process, yet having heat conductivity greater than gasses, such as air or welding inert gas, that would otherwise occupy any gaps existing between the opposed turbine blade surface 12 and the heat sink chiller block first surface 32. Therefore, while the conformable heat conductive filler material 40 thermal conductivity may be less than that of the superalloy or the chiller block 30 metal, the potential aggregate heat transfer capacity, efficiency and consistency with the filler material is greater than without use of the filler material. Suitable conformable heat conductive filler materials comprise acrylic and other elastomers, including heat curable elastomers. The elastomer may include metallic and/or ceramic filling material. The filler material 40 may include grease or other fluid phase materials confined between the heat sink chiller block 30 first surface 32 and the turbine blade component surface 12. The filler material may be capable of undergoing a physical/chemical phase change when heated during component welding, so as to increase heat absorption while undergoing the phase change.

Figure 4:
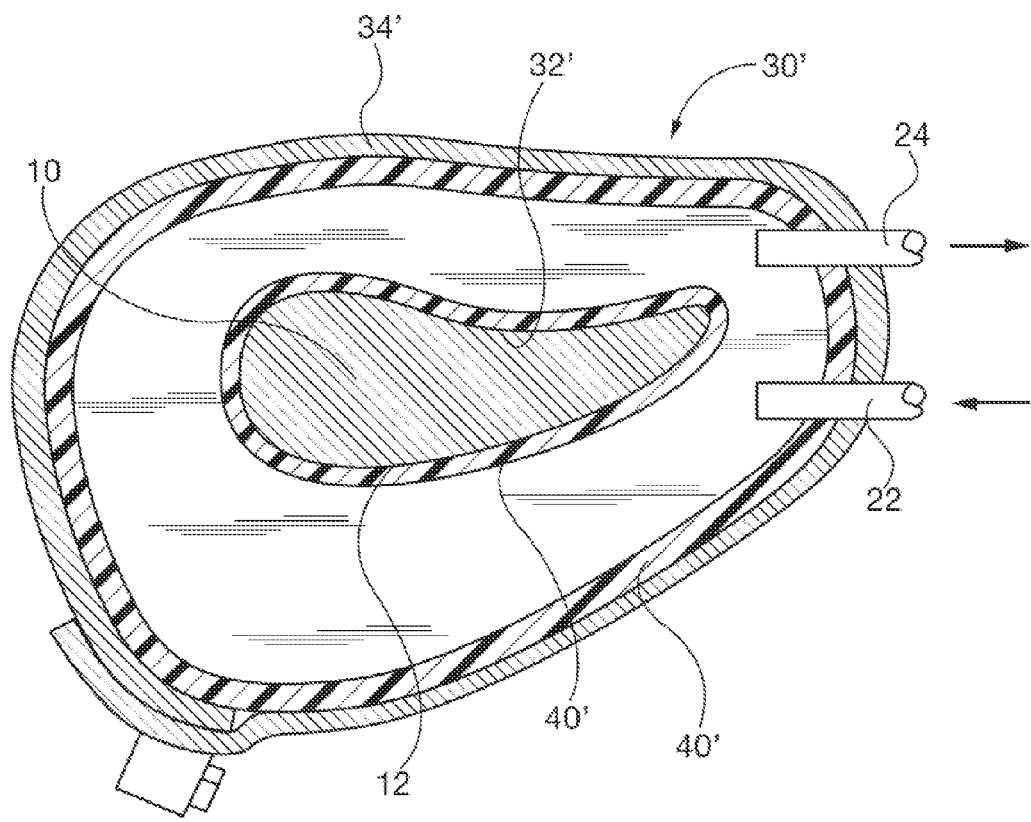
FIG. 4 is a cross sectional elevation view similar to FIG. 2, of another embodiment of a heat sink apparatus of the present invention.

In alternative embodiments of the heat sink apparatus and related cooling system conformable structure heat sinks may be substituted for the rigid fixed chiller block heat sink 30 of the embodiment of FIGS. 1-3. The conformable heat sink may incorporate the filler material 40, such as by forming the heat sink from compliant elastomer. In FIG. 4, the heat sink apparatus 30' comprises a compliant elastomeric bladder 40' that circumferentially envelops the turbine blade 10, with a first inner surface 32' that is in direct conforming contact with the turbine blade component surface 12, without any gaps. In this embodiment the bladder 40' is circumferentially restrained by an outer clamping shroud 34'. Coolant flows through the bladder via inlet 22 and outlet 24 that are in fluid communication with other components of the cooling system 20, as shown previously in FIG. 1. Coolant flow within the bladder and/or compressive force of the clamping shroud 34' biases the bladder 40' first inner surface 32' in contact with the turbine blade component surface 12.

Figure 5:
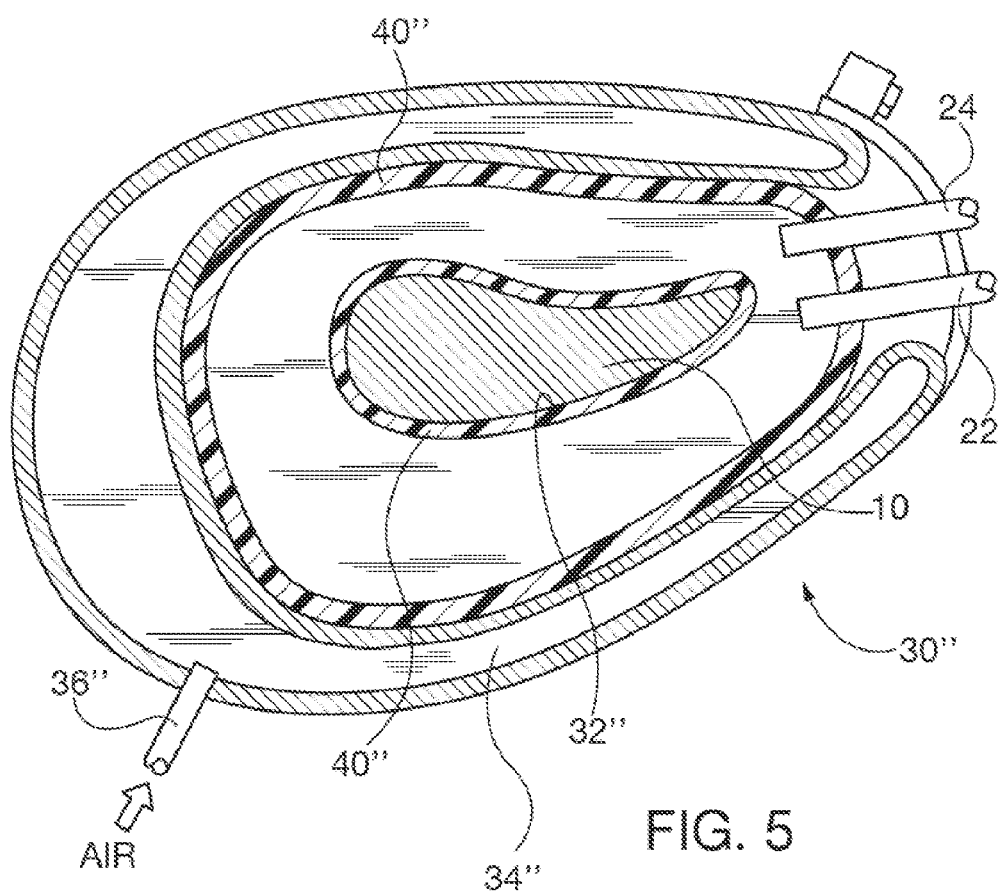
FIG. 5 is a cross sectional elevation view similar to FIG. 2, of an additional embodiment of a heat sink apparatus of the present invention.

Another alternative embodiment bladder-type heat sink structure 30" is shown in FIG. 5, utilizing a compliant bladder 40" similar to that of the embodiment of FIG. 4, with a cooling fluid inlet 22 and outlet 24 in communication with the rest of the cooling system 20. The clamping shroud 34" is a flexible pneumatic cuff coupled to a pressurized air or other gas supply 36" that creates a compressive biasing force, so that the bladder 40" compliant material inner surface 32" is in direct, gap-less contact with the turbine blade circumferential surface 12. Varying pressure in the pneumatic cuff clamping shroud 34" varies the biasing force between the bladder 40" inner surface 32" and the blade circumferential surface 12.

Figure 6:
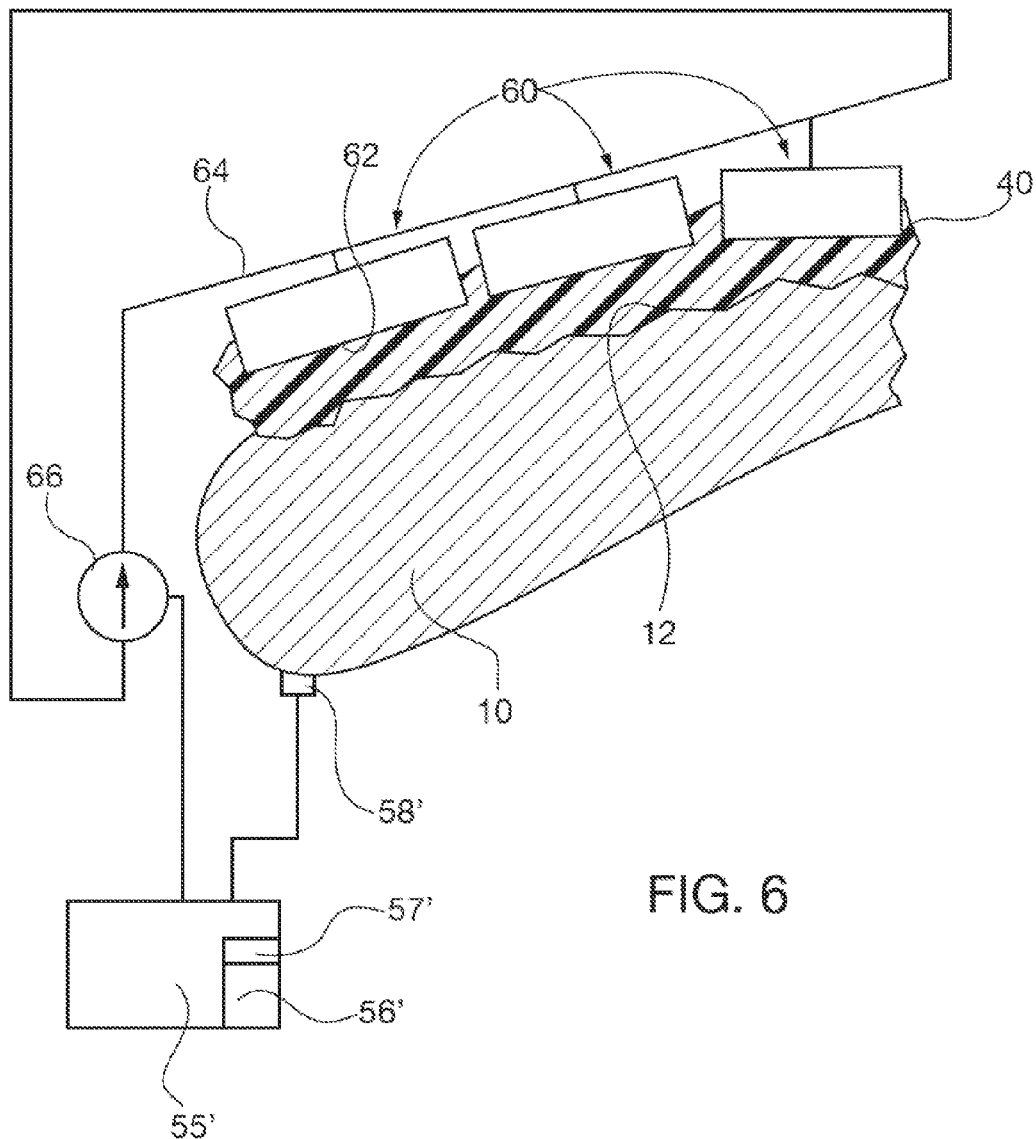
FIG. 6 is a cross sectional elevation view similar to FIG. 2, of yet another embodiment of a heat sink apparatus of the present invention.

Another superalloy component welding cooling system alternative embodiment is shown in FIG. 6. In this embodiment the heat sink apparatus comprises at least one, and preferably a plurality of known thermoelectric modules 60 that are oriented about the turbine blade 10 outer surfaces 12. Conformable heat conductive material 40 is interposed between the turbine blade 10 outer surface 12 and the first inner surface 62 of the respective thermocouple module 60 heat sinks. For example a layer of the conductive material 40 can be applied directly to the turbine blade outer surface 12 before orienting each first inner surface 62 in abutting relationship with the blade outer surface. The thermoelectric heat sink modules 60 are coupled to power leads 64, which are in turn coupled to a current source 66. The thermoelectric modules 60 cooling capacity is selectively varied by varying current source 66 current flow. Analogous to the fluid cooling system 20 embodiment of FIG. 1, a known controller, such as the industrial controller 55', includes a processor 56' accessing and executing a non-transitory software program instruction set stored in non-volatile memory 57', and selectively actuates the current source 66 in order to regulate the respective thermoelectric heat sinks 60 cooling capacity. Optionally the controller 55' is coupled to a temperature sensor 58' that senses the superalloy blade component 10 temperature, and varies the heat sink thermoelectric modules 60 cooling capacity in response to the sensed temperature, such as in a known closed feedback control loop.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A heat sink apparatus for cooling a superalloy turbine component during component welding, comprising:

a fluid-filled cooling bladder having an outer contact surface, for abutting orientation and enveloping contact with a portion of a turbine component surface, and an inner surface in communication with the cooling bladder internal, first cooling fluid;

the cooling bladder outer contact surface formed with a non-gaseous, conformable, heat conductive material for conforming, abutting contact with the turbine component surface; and a clamping shroud, for enveloping the cooling bladder and the turbine component, so that all of the outer contact surface is in direct, gap-less contact with the corresponding turbine component surface, and the inner surface is in communication with the cooling bladder internal, first cooling fluid, the clamping shroud including a flexible, inflatable cuff that creates a compressive biasing force, for biasing the outer contact surface and the component surface against each other.

2. The apparatus of claim 1, the heat conductive material comprising an elastomer.

3. The apparatus of claim 2, the heat conductive material comprising a metallic-filled elastomer.

4. The apparatus of claim 2, the heat conductive material comprising a ceramic-filled elastomer.

5. The apparatus of claim 2, the heat conductive material comprising an acrylic elastomer.

6. The apparatus of claim 2, the heat conductive material comprising a heat curable elastomer.

7. The apparatus of claim 1, the heat conductive material further comprising grease interposed between the respective outer contact and component surfaces.

8. The apparatus of claim 1, the heat conductive material further comprising a second fluid confined between the respective outer contact and component surfaces.

9. The apparatus of claim 1, the cooling bladder internal, first cooling fluid capable of undergoing phase change when heated during component welding.

10. The apparatus of claim 1, the inflatable cuff further comprising a selectively variable pressure pneumatic cuff, for selectively varying biasing force between the cooling bladder outer contact surface and the turbine component surface.

11. The apparatus of claim 10, the pneumatic cuff circumscribing the cooling bladder and a turbine component.

12. A cooling system for cooling a superalloy turbine component during component welding, comprising:

a variable cooling capacity heat sink, including:

a fluid-filled cooling bladder having an outer contact surface, for abutting orientation and enveloping contact with a portion of a turbine component surface, and an inner surface in communication with the cooling bladder internal fluid;

the cooling bladder outer contact surface formed with a non-gaseous, conformable, heat conductive material for conforming, abutting contact with the turbine component surface; and a clamping shroud, for enveloping the cooling bladder and the turbine component, so that all of the outer contact surface is in direct, gap-less contact with the corresponding turbine component surface, and the inner surface is in communication with the cooling bladder internal fluid, the clamping shroud including a flexible, inflatable cuff that creates a compressive biasing force, for biasing the outer contact surface and the component surface against each other;

a temperature sensor for sensing turbine component temperature; and a control system coupled to the temperature sensor and the heat sink, for varying heat sink cooling capacity in response to sensed component temperature, by varying the cooling bladder internal fluid flow.

13. The system of claim 12, the controller varying heat sink cooling capacity in a closed feedback loop utilizing temperature sensor sensed turbine component temperature as an input and bladder internal fluid flow rate as an output.

14. A method for cooling a superalloy turbine component during component welding, comprising:

providing a turbine component, having a component surface;

providing a heat sink apparatus, including:

a fluid-filled cooling bladder having an outer contact surface, for abutting orientation and enveloping contact with a portion of a turbine component surface, and an inner surface in communication with the cooling bladder internal fluid;

the cooling bladder outer contact surface formed with a non-gaseous, conformable, heat conductive material for conforming, abutting contact with the turbine component surface; and a clamping shroud, for enveloping the cooling bladder and the turbine component, so that all of the outer contact surface is in direct, gap-less contact with the corresponding turbine component surface, and the inner surface is in communication with the cooling bladder internal fluid, the clamping shroud including a flexible, inflatable cuff that creates a compressive biasing force, for biasing the outer contact surface and the component surface against each other, orienting and abutting the cooling bladder outer contact surface in enveloping contact with a portion of the turbine component surface;

enveloping the cooling bladder and the turbine component with the clamping shroud and inflating the inflatable cuff, so that all of the outer contact surface is in direct, gap-less contact with the corresponding turbine component surface;

circulating internal fluid within the cooling bladder; and welding the turbine component, capturing heat generated during the welding within the cooling bladder and its circulating internal cooling fluid.

15. The method of claim 14 further comprising:

the provided heat sink apparatus further including a temperature sensor for sensing turbine component temperature, and a control system coupled to the temperature sensor and the heat sink, for varying heat sink cooling capacity in response to sensed component temperature, by the varying cooling bladder internal fluid flow; and varying cooling bladder internal fluid flow with the control system in response to component temperature sensed by the temperature sensor.

16. The method of claim 14, further comprising applying heat conductive material to one of the respective outer contact or turbine component surfaces prior to orienting and abutting said surfaces.

17. The method of claim 14 further comprising heat curing the conductive material.

18. The method of claim 14 further comprising biasing the outer contact and turbine component surfaces against each other during the cuff inflation.

* * * * *